US011507736B2

(12) United States Patent
Kolesov et al.

(10) Patent No.: US 11,507,736 B2
(45) Date of Patent: Nov. 22, 2022

(54) AUTOMATED ELECTRONIC FORM GENERATION

(71) Applicant: Payformix LLC, Broomfield, CO (US)

(72) Inventors: Alex A. Kolesov, Broomfield, CO (US); Evgeny Taranda, Boulder, CO (US)

(73) Assignee: Payformix LLC, Reston, VA (US)

( * ) Notice: Subject to any disclaimer, the term of this patent is extended or adjusted under 35 U.S.C. 154(b) by 0 days.

(21) Appl. No.: 16/935,499

(22) Filed: Jul. 22, 2020

(65) Prior Publication Data

US 2020/0372209 A1 Nov. 26, 2020

Related U.S. Application Data

(63) Continuation of application No. 16/133,897, filed on Sep. 18, 2018, now Pat. No. 10,762,286.

(Continued)

(51) Int. Cl.
*G06F 17/10* (2006.01)
*G06F 40/174* (2020.01)
*G06F 40/106* (2020.01)

(52) U.S. Cl.
CPC .......... *G06F 40/174* (2020.01); *G06F 40/106* (2020.01)

(58) Field of Classification Search
CPC ............................ G06F 40/174; G06F 40/106
See application file for complete search history.

(56) References Cited

U.S. PATENT DOCUMENTS

| 6,233,726 B1 * | 5/2001 | Bowman | G06F 8/34 717/109 |
| 6,342,907 B1 * | 1/2002 | Petty | G06F 8/38 715/708 |

(Continued)

FOREIGN PATENT DOCUMENTS

WO 2016193995 8/2016

OTHER PUBLICATIONS

HTML Code Editor, available at https://web.archive.org/web/20171027235401/http://htmlcodeeditor.com/ (Year: 2017).*

(Continued)

*Primary Examiner* — Shahid K Khan
(74) *Attorney, Agent, or Firm* — Jaffery Watson Mendosa & Hamilton LLP

(57) ABSTRACT

Methods and systems for automated electronic form generation are provided. According to one embodiment, a non-transitory machine readable medium stores instructions that when executed by a processing resource of a computer system cause the processing resource to facilitate electronic form authoring. An interactive form authoring interface is displayed on the computer system including a single text entry field and a form preview area. Text input relating to an electronic form being authored by an authoring user is accepted via the text entry field. The text input is sent to a software component operable to obtain form definition information from the text input and to generate a rendered view of the electronic form based on the form definition information. The authoring user is provided with feedback regarding an appearance and functionality of the electronic form by updating the form preview area based on the rendered view.

22 Claims, 9 Drawing Sheets

Related U.S. Application Data

(60) Provisional application No. 62/561,432, filed on Sep. 21, 2017.

(56) References Cited

U.S. PATENT DOCUMENTS

| | | | |
|---|---|---|---|
| 6,404,441 B1 | 6/2002 | Chailleux | |
| 7,496,837 B1* | 2/2009 | Larcheveque | G06F 40/166 |
| | | | 715/237 |
| 7,665,061 B2* | 2/2010 | Kothari | G06F 8/30 |
| | | | 717/110 |
| 7,849,440 B1* | 12/2010 | Englehart | G06F 8/34 |
| | | | 717/109 |
| 7,941,743 B2* | 5/2011 | Reddy | G03G 15/502 |
| | | | 715/764 |
| 8,069,433 B2* | 11/2011 | Parsell | G06F 16/958 |
| | | | 717/172 |
| 8,413,070 B1 | 4/2013 | Castrucci | |
| 8,607,166 B2* | 12/2013 | Jalon | G06F 3/04817 |
| | | | 715/837 |
| 8,707,157 B1* | 4/2014 | Chouhan | G06F 40/174 |
| | | | 715/224 |
| 8,843,467 B2 | 9/2014 | Messer | |
| 9,009,313 B2* | 4/2015 | Rice | G06Q 99/00 |
| | | | 709/219 |
| 9,489,119 B1 | 11/2016 | Smith, Jr. | |
| 9,524,283 B2* | 12/2016 | Folsom | G06F 40/143 |
| 10,417,324 B1* | 9/2019 | Linden | G06F 3/0484 |
| 10,482,150 B1 | 11/2019 | Denzer | |
| 2002/0099717 A1* | 7/2002 | Bennett | G06F 40/174 |
| | | | 707/999.102 |
| 2002/0109736 A1 | 8/2002 | Chailleux | |
| 2002/0116417 A1* | 8/2002 | Weinberg | G06F 40/174 |
| | | | 707/E17.058 |
| 2002/0138582 A1 | 9/2002 | Chandra | |
| 2003/0078033 A1* | 4/2003 | Sauer | H04M 1/72436 |
| | | | 455/466 |
| 2004/0143790 A1* | 7/2004 | Ding | G06F 40/174 |
| | | | 715/223 |
| 2004/0181749 A1 | 9/2004 | Chellapilla | |
| 2004/0205118 A1* | 10/2004 | Yu | G06F 40/131 |
| | | | 715/255 |
| 2004/0205525 A1* | 10/2004 | Murren | G06F 40/174 |
| | | | 715/234 |
| 2005/0027510 A1 | 2/2005 | Moore | |
| 2005/0065936 A1* | 3/2005 | Goering | G06F 40/174 |
| 2005/0114764 A1* | 5/2005 | Gudenkauf | G06F 40/174 |
| | | | 715/251 |
| 2006/0136810 A1* | 6/2006 | Truong | G06F 40/174 |
| | | | 715/222 |
| 2007/0016614 A1 | 1/2007 | Novy | |
| 2007/0078725 A1* | 4/2007 | Koszewski | G06Q 30/0635 |
| | | | 705/26.81 |
| 2007/0180148 A1* | 8/2007 | Yadidian | G06F 40/174 |
| | | | 709/246 |
| 2007/0266324 A1 | 11/2007 | Chailleux | |
| 2008/0109715 A1* | 5/2008 | Stover | G06F 16/958 |
| | | | 707/999.102 |
| 2008/0140384 A1* | 6/2008 | Landau | G06F 40/20 |
| | | | 704/9 |
| 2009/0138790 A1* | 5/2009 | Larcheveque | G06F 40/166 |
| | | | 715/224 |
| 2009/0313601 A1* | 12/2009 | Baird | G06F 8/34 |
| | | | 715/764 |
| 2010/0169074 A1* | 7/2010 | Hung | G06F 40/174 |
| | | | 704/8 |
| 2010/0251092 A1* | 9/2010 | Sun | G06F 40/174 |
| | | | 715/221 |
| 2012/0010995 A1* | 1/2012 | Skirpa | G06F 16/9577 |
| | | | 705/14.49 |
| 2012/0210210 A1* | 8/2012 | Itoh | G06F 40/106 |
| | | | 715/236 |
| 2012/0215578 A1 | 8/2012 | Swierz, III | |
| 2013/0097478 A1* | 4/2013 | Allison | G06Q 10/10 |
| | | | 715/222 |
| 2013/0117652 A1* | 5/2013 | Folsom | G06F 40/174 |
| | | | 715/222 |
| 2013/0124961 A1 | 5/2013 | Linburn | |
| 2014/0096019 A1 | 4/2014 | Gowen | |
| 2014/0237341 A1 | 8/2014 | Stover | |
| 2014/0237350 A1* | 8/2014 | Ryall | H04L 65/403 |
| | | | 715/234 |
| 2014/0310582 A1 | 10/2014 | Bardman | |
| 2014/0331124 A1* | 11/2014 | Downs | G06F 40/106 |
| | | | 715/243 |
| 2015/0135051 A1* | 5/2015 | Gerardin | G06Q 10/10 |
| | | | 715/229 |
| 2015/0160931 A1* | 6/2015 | Glazer | G06F 9/452 |
| | | | 717/109 |
| 2015/0347352 A1* | 12/2015 | Narayanan | G06Q 10/10 |
| | | | 715/222 |
| 2015/0356065 A1* | 12/2015 | Ghosh | G06F 40/186 |
| | | | 715/222 |
| 2017/0032050 A1* | 2/2017 | Kol | G06F 40/106 |
| 2017/0090734 A1* | 3/2017 | Fitzpatrick | G06F 3/0486 |
| 2017/0161242 A1 | 6/2017 | Clark | |
| 2017/0177715 A1* | 6/2017 | Chang | G06N 5/04 |
| 2017/0220542 A1* | 8/2017 | Wolfram | G06F 40/143 |
| 2017/0351660 A1* | 12/2017 | Warstler | G06F 40/279 |
| 2018/0196871 A1 | 7/2018 | Butler | |
| 2018/0211395 A1 | 7/2018 | King | |
| 2018/0239507 A1 | 8/2018 | Bui | |
| 2018/0239959 A1 | 8/2018 | Bui | |
| 2019/0087398 A1 | 3/2019 | Kolesov | |
| 2019/0087463 A1 | 3/2019 | Dua | |
| 2019/0347093 A1 | 11/2019 | Challagolla | |
| 2019/0355102 A1 | 11/2019 | Lin | |

OTHER PUBLICATIONS

Ghorashi et al., Integrating Collaborative and Live Coding for Distance Education, IEEE Computer, May 2017 (Year: 2017).*

Screendoor, "Building your form," (published Mar. 26, 2016) (available at https://web.archive.org/web/20160307145405/http://help.dobt.co/) (Year: 2016).*

Form Builder, "Free Online Order Form Builder", https://www.123formbuilder.com/online-order-form/, downloaded Mar. 27, 2020, 7 pages.

Form Builder, "Web Forms", https://www.123formbuilder.com/web-forms/, downloaded Mar. 27, 2020, 6 pages.

Aidaform, "Collect Them All: A Contact Form that Converts", https://aidaform.com/forms/contact-form.html., downloaded Mar. 27, 2020, 7 pages.

Cognitoforms, "Building Forms", https://www.cognitoforms.com/support/1/buiiding-forms, downloaded Mar. 27, 2020, 3 pages.

Cognitoforms, "Easily Build Powerful Forms", https://www.cognitoforms.com., downloaded Mar. 27, 2020, 8 pages.

Formsite, "Features", https://www.formsite.com/features/, downloaded Mar. 24, 2020, 4 pages.

Formstack, "Add, Edit, Delete, Copy, Move Fields", https://help.formstack.com/hc/en-us/articles/360019205852-Add-Edit-Delete-Copy-Move-Fields, downloaded Mar. 24, 2020, 6 pages.

Formstack, "Address Fields", https://help.formstack.com/hc/en-us/articies/360019205532-Address-Fields, downloaded Mar. 24, 2020, 3 pages.

Formstack, "Checkbox Fields", https://help.formstack.com/hc/en-us/articles/360019521431-Checkbox-Fields, downloaded Mar. 24, 2020, 8 pages.

Formstack, "Date/Time Fields", https://help.formstack.com/hc/en-us/articles/360019205572-Date-Time-Fields, downloaded Mar. 24, 2020, 6 pages.

Formstack, "Description Area Fields", https://help.formstack.com/hc/en-us/articles/360019521091-Description-Area-Fields, downloaded Mar. 24, 2020, 3 pages.

Formstack, "Dropdown List Fields", https://help.formstack.com/hc/en-us/articles/360019521271-Dropdown-List-Fields, downloaded Mar. 24, 2020, 7 pages.

(56) References Cited

OTHER PUBLICATIONS

Formstack, "File Upload Fields", https://help.formstack.com/hc/en-us/3600195205772-File-Upload-Fields, downloaded Mar. 24, 2020, 9 pages.
Formstack, "Grow Your Organization with User-Friendly Form Features.", https://www.formstack.com/features, downloaded Mar. 24, 2020, 8 pages.
Formstack, "Get Started with Formstack", https://www.formstack.com/getting-started, downloaded Mar. 24, 2020, 5 pages.
Jotform, "Create Forms", https://www.jotforrn.com/help/chapter-2-Create-Forms, downloaded Mar. 24, 2020, 14 pages.
Jotform, "How to Create Your First Web Form", https://www.jotform.com/help/2-How-to-Create-Your-First-Web-Form, downloaded Mar. 24, 2020, 27 pages.
Jotform, "Quick Overview of Form Fields", https://www.jotform.com/help/46-Quick-Overview-of-Form-Fields, downloaded Mar. 24, 2020, 35 pages.
Pabbly, "Only Form Builder in the World that Does Not Restrict You on Features"., https://www.pabbly.com/form-builder/, downloaded Mar. 27, 2020, 9 pages.
Wufoo, "Build a Form", https://help.wufoo.com/categories/Build_a_Form, downloaded Mar. 24, 2020, 3 pages.
Wufoo, Demo—Untitled Form, https://www.wufoo.com/form-builder/, downloaded Mar. 24, 2020, 1 page.
Wufoo, "Powerful Features. Easy to Use.", https://www.wufoo.com/features/, downloaded Mar. 24, 2020, 12 pages.
Wufoo, "Build a Form-Field Settings", https://help.wufoo.com/categories/Build_a_Form, downloaded Mar. 24, 2020, 3 pages.
Wufoo, Build a Form-Field Types https://help.wufoo.com/categories/Build_a_Form, downloaded Mar. 24, 2020, 2 pages.
Wufoo, "Build a Form—Form Settings, Rules & Logic", https://help.wufoo.com/categories/Build.a.Form, downloaded 24, 2020, 3 pages.
Wufoo, "Build a Form—Managing Forms", https://help.wufoo.com/categories/Build.a.Form, downloaded Mar. 24, 2020, 2 pages.
Formstack, "Pre-Populating Form Fields", https://help.formstack.com/hc/en-us/articles/360019200272-Pre-Populating-Form-Fields, downloaded Mar. 24, 2020, 9 pages.
Notice of Allowance for U.S. Appl. No. 16/133,897, dated Apr. 22, 2020, 10 pages.
Non-Final Office Action for U.S. Appl. No. 16/133,897, dated Dec. 2, 2019, 20 pages.

\* cited by examiner

Create new form

WHAT: Contact Form
TEXT: Please fill out your contact information below.
FORM: Name
TEXT: I can be reached at:
FORM: Email, Phone, Address Contact Form Please fill out your contact information below.

First name    Last name

I can be reached at:

Email
Phone
Street address
City
State
Zip

AUTOMATED ELECTRONIC FORM GENERATION

CROSS-REFERENCE TO RELATED PATENTS

This application is a continuation of U.S. patent application Ser. No. 16/133,897, filed on Sep. 18, 2018, which claims the benefit of priority of U.S. Provisional Application No. 62/561,432, filed on Sep. 21, 2017, both of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2017-2020, Payformix LLC.

BACKGROUND

Field

Embodiments of the present invention generally relate to automated code generation, automated user interface generation and electronic forms technology. More particularly, embodiments of the present invention relate to automated electronic form generation based on natural language input potentially augmented with some structure, punctuation characters and/or special symbols.

Description of the Related Art

Electronic forms are used in a variety of circumstances and settings for purposes of collecting information. For example, electronic forms can be used as an interactive mechanism to gather information from web site visitors, to perform online polling or surveying, to perform scheduling, to accept event registrations and to perform a variety of other tasks. Electronic forms are authored using structured language editors, graphical user interface (GUI) tools, relying on drag-and-drop functionality, or sometimes a combination of structured language editors and GUI tools. Electronic forms may have complex requirements and logic as various fields and form elements, among other things, may be interdependent and require different types of constraint checking and/or validation.

There are a number of limitations associated with current methods of authoring electronic forms. Users lacking or having limited specialized knowledge of structured languages, such as markup or computer programming languages, find it difficult to produce code, which can be properly compiled and/or rendered by a computer system in order to provide expected functionality. Meanwhile, existing GUI tools, which purport to simplify electronic form generation, presume end users are familiar with the various types of electronic form fields and elements as well as the types of settings and options associated with such fields and elements. Furthermore, the complex interfaces of existing GUI tools are unsuitable for mobile devices (e.g., smartphones and tablet computers) having relatively small screens as compared to typical desktop devices and presume the end user has a pointing device, such as a mouse or a track-pad, to drag and drop form elements form a first portion of the screen having a tool bar to another area of the screen in which a non-functional preview of the electronic form is presented. These complex interfaces also at times require the end user to interact with multiple portions of the interface (e.g., a tool bar area, options/settings tabs/menus and/or a form preview area) to edit the electronic form being created. For example, the end user may be required to select a particular form element in the preview window that is to be modified and then must navigate to an appropriate portion of a menu or tab to select the desired option or setting for the selected form element. Such interactions, which may involve drilling down through many layers to get to desired options/settings or functionality, are inefficient, complex and difficult to learn, particularly for novice users and are especially difficult to perform in the context of a relatively small screen of a mobile device. Finally, traditional electronic form generation tools perform a great deal of their processing on the client side, which might be infeasible on mobile devices due to processing, memory and/or battery life limitations.

In view of the foregoing, there is a need in the art for improved electronic form generation technology, including a simplified text-based interface suitable for both desktop computing and mobile devices and an intelligent backend that can infer an end user's intent regarding desired electronic form elements specified based on natural language input and optional supplemental information that may provide context.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 2 illustrates a user interface for entry of natural human language or near-natural human language and resulting rendering by an electronic form generation system in accordance with an embodiment of the present invention.

FIG. 5 illustrates a user interface for entry of natural human language or near-natural human language and resulting context-informed rendering by an electronic form generation system in accordance with an embodiment of the present invention.

FIG. 6 illustrates a user interface for entry of natural human language or near-natural human language and resulting context-informed rendering by an electronic form generation system in accordance with an embodiment of the present invention.

FIG. 7 illustrates a user interface for entry of natural human language or near-natural human language and resulting context-informed rendering by an electronic form generation system in accordance with an embodiment of the present invention.

DETAILED DESCRIPTION

Figure 1:
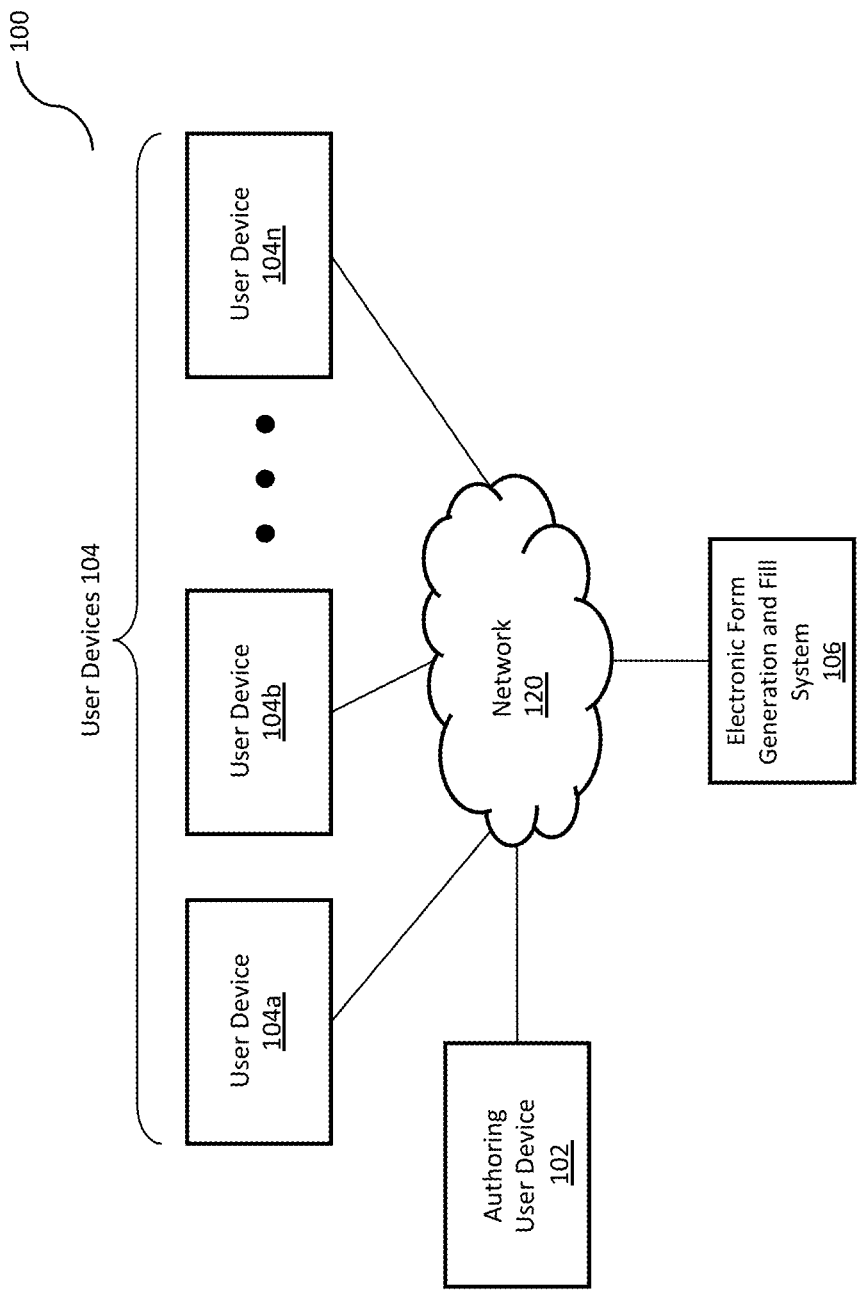
FIG. 1 illustrates an environment in which an electronic form generation system can operate.

Methods and systems are described for automated electronic form generation. Recognized herein is the need to provide users wishing to create electronic forms easier ways of authoring properly functioning electronic forms. Systems and related methods described herein may provide users with a new way of authoring electronic forms, which utilizes use of a natural human language, such as the English language, in order to obtain an electronic form. Embodiments of the present invention seek to facilitate generation and editing of a functional electronic form through a simplified user interface that is suitable for both mobile devices and desktop computer systems. For purposes of enabling efficient interaction with the form generation system described herein, in one embodiment, an improved user interface may limit receipt of information describing the desired electronic form to a single active user interface control, for example, a single text-entry field, thereby avoiding the typical requirement by existing GUI tools to navigate between and among various screens, tabs and levels of menus to select options and/or settings for a particular electronic form element. Additionally, the user interface may concurrently provide a real-time or near real-time preview of the electronic form in a fully functional state, thereby allowing the authoring user to test the electronic form without having to change modes (e.g., from an editing mode to a testing mode). As described further below, in embodiments of the present invention, a text-based description of the desired electronic form is provided by the authoring user in a form of a natural language. Optional supplemental information may be expressly specified by the authoring user, obtained by the electronic form generation system from the authoring device or inferred based on indirect references or other clues, for example, postal addresses either in the text part of the electronic form or form fields.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the present disclosure the phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

FIG. 1 illustrates an environment 100 in which an electronic form generation and fill system 106 can operate, according to some embodiments. The electronic form generation and fill system 106 is interconnected with one or more user devices 102 and 104, through one or more communication networks 120.

The electronic form generation and fill system 106 may be configured to provide, among other things, a facility for generating electronic forms, for distributing electronic forms through communication networks 120, and for collecting information filled into electronic forms distributed by electronic form generation and fill system 106.

User devices 102 and 104, such as user devices 104*a*, 104*b* through 104*n* may be associated with one or more users, and be configured to provide a visual interface, as well as one or more devices or methods for inputting text, voice, touch or data available to an intelligent electronic assistant associated with the device and/or its user. Examples of user devices 102, 104 (a through n) may include mobile phones, personal digital assistants, personal computers, wearable devices, and any other devices including computing and data communication functionality. Authoring user device 102 is utilized by a user to communicate with electronic form generation and fill system 106 for the purpose of authoring an electronic form and transmitting information describing the electronic form. The electronic form generation and fill system 106 will transmit the user interface to the authoring user device 102 necessary for entry of information describing the electronic form. User devices 104 are utilized by their respective users to receive a distribution from the electronic form generation and fill system 106 of the electronic form authored by a user of authoring user device 102 and to fill in information requested in the electronic form. The information requested in the form may be filled using any of the input methods available to the user device 104a, 104b, through 104n.

As those skilled in the art will appreciate, distribution of functionality between clients and servers in a client-server architecture includes various considerations (e.g., the relative computational and/or memory resources available on the device(s) representing or running the client and the server) and tradeoffs (e.g., communication latency between the device(s) representing or running the client and the server). In some embodiments, the electronic form generation and fill system 106 may reside at least partially on user devices 102 and 104 (for example, in a locally stored application or an application which is made available locally, in full or partially, for the duration of execution of one or more operations supported by the application) and/or may be distributed between them. In other embodiments, the electronic form generation and fill system 106 may reside on a computer host external to user devices 102 and 104.

The electronic form generation and fill system 106 may comprise servers, databases and other facilities that allow its users provide information and/or data. Information or data may include, among other things, descriptions of the electronic forms, their intended usage, parameters of information and data to be requested in the electronic forms, logic parameters methods of handling or otherwise processing information and data filled by electronic form users.

If the electronic form generation system employs a client-server model or client-server architecture, a person of ordinary skill in the art may appreciate that the system relies on technology or computer model that separates applications, programs, processes or devices into two categories, clients and servers, for example, to better employ available computing resources and/or share data processing loads. As noted below, a client and a server can be within the same computing environment (e.g., a client process and a server process running on the same computer system). Alternatively, the client and server may run on or be represented by separate computers. For example, a client computer system may provide the user interaction-facility (e.g., a user interface) and some or all application processing, while the server computer system might provide high-volume storage capacity and or processing power to perform natural language processing, for example.

A client may be implemented as an application, program, process or device in a client/server relationship that requests information or services from another program, process or device (a server) on a network or within the same computing environment. An application may be a client to one application but a server to another. A client may be comprised of software that makes the connection between a requesting application, program, process or device to a server possible, such as a File Transfer Protocol (FTP) client.

In turn, a server may be implemented as an application, program, process or device in a client/server relationship that responds to requests for information or services by another program, process or device (a client) on a network or within the same computing environment. Server may also encompass software that makes the act of serving information or providing services possible.

Electronic forms may be implemented as web pages with a limited number of interactive components which allow for user input of requested information. Electronic forms are also commonly referred to as online forms, web forms, online web forms or HTML forms. Electronic forms can be rendered in modern browsers using HTML and/or related web-oriented languages. However, as interaction with online and computer systems undergo changes, electronic forms may sometime not be rendered visually in a static manner, but instead rely on other methods of presenting and requesting information to a user, for example using audio and other rich media.

Electronic forms may be comprised of various components, such as form elements or electronic form elements, which may be static and/or dynamic. Non-limiting examples of static form elements include titles, headers, static text, field descriptions, graphics and media. Non-limiting examples of dynamic form elements include short text entry fields, long text entry fields, drop-down lists, radio buttons, check boxes, spinners, file or media upload tools, survey elements, such as input tables, star ratings and scale ratings, any other components that may change or produce varying outputs as users interact with the form.

The network 120 may be a communication pathway between the electronic form generation and fill system 106 and the user devices 102 and 104. The network 120 may comprise any combination of local area and/or wide area networks using both wireless and/or wired communication systems. For example, the network 120 may include the Internet, as well as mobile telephone networks. In one embodiment, the network 120 uses standard communications technologies and/or protocols. Hence, the network 120 may include links using technologies such as Ethernet, 802.11, worldwide interoperability for microwave access (WiMAX), 2G/3G/4G mobile communications protocols, asynchronous transfer mode (ATM), InfiniBand, PCI Express Advanced Switching, etc. Other networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), standard generalized markup language (SGML), extensible hypertext markup language (XHTML), Wikitext (a/k/a Wiki markup or Wikicode), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

Figure 2:
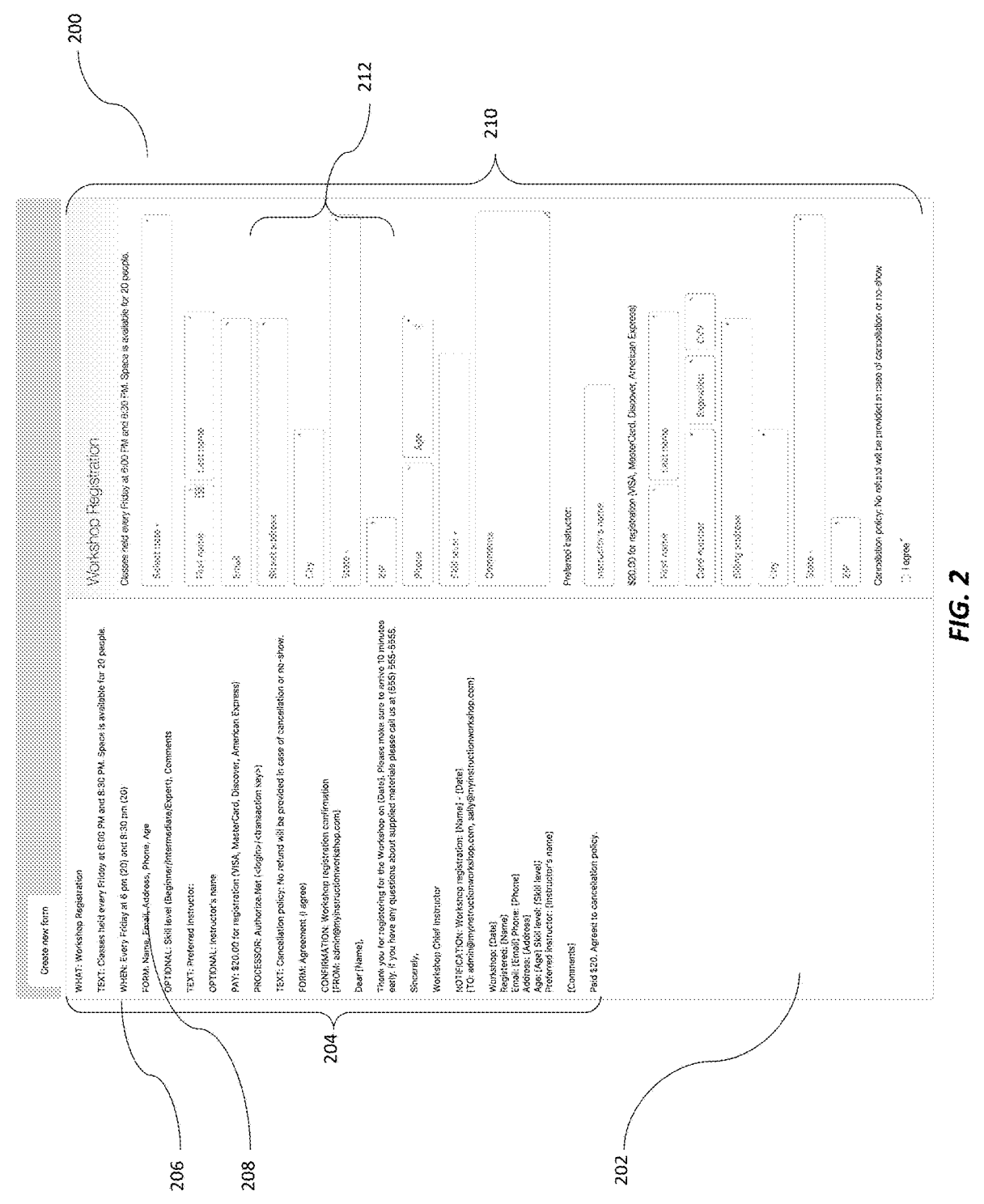

The electronic form generation and fill system 106 causes an authoring user device 102 to display a user interface 200. An example of a user interface displayed on an authoring user device 102 is shown in FIG. 2. If the authoring user device 102 is capable of supporting text input, in some embodiments, the user interface may include a single text input field 202. A user of the authoring user interface device 102 may type into the text input field 202 information 204 describing the desired electronic form. Information 204 may be in the form of natural human language, for example, the English language. In some embodiments, the natural human language, such as the English language may be supplemented with meta information 206, the purpose of which may be to clarify the context of the natural human language used to describe the electronic form. The user of the authoring user device 102 may freely describe the electronic form, provide the form title, provide a summary, name the form fields, identify processing requirements, such as input validation, logic, presentation and processing rules. The authoring user may be required to follow a minimal structure while providing the description, for example, a sequence of fields.

The user interface presented on the authoring user interface device 102 may also include a rendered variant 210 of the electronic form. The rendered variant 210 of the electronic form may display an approximation of appearance of the final electronic form. For example, when the authoring user types in a natural human language description or natural human language description supplemented with meta information 206, the electronic form generation and fill system 106 determines the context of the entered text and produces structured language needed for interpretation and rendering of a corresponding electronic form field.

In some embodiments, in response to the user typing in natural human language description or natural human language description supplemented with meta information 206, the electronic form generation and fill system 106 may determine from the context of the description that a set of electronic form fields is required according to electronic form design and data collecting conventions. For example, in response the user typing describing the form as requiring address information 208, the electronic form generation and fill system 106 may generate a set of fields 212 representing different data components of address information, such as Street Address, City, State, Zip Code, and so on. Application of heuristic analyses of natural human language or natural human language supplemented with meta information typed in by the authoring user may yield many contexts where multiple items of data may be called for, even when a user uses a shorthand description.

Embodiments where natural human language is supplemented with meta information 206, the meta information may be meant to provide context additional to the natural human language or near-natural human language utilized by the user. Such meta information, for example, may be typed in by the authoring user and comply with pre-determined rules and/or conventions. In addition, where the user interface presented to the authoring user on the authoring user device 102 may consist of a plurality of form information text fields, the meta information and additional context may be derived from designation the text fields to certain types of information. Other, additional forms of context may be derived from the user's geographic location or region, which may be explicitly specified by the authoring user, determined by receiving information from the reference to geolocation hardware associated with the authoring user device or deduced or guessed by analyzing indirect references or other clues, for example, postal addresses either in the text part of the electronic form or form fields.

In the case of audio input interface, audio input may be translated into text input using a speech-to-text algorithm, to enable other processing outlined above to be performed on recognized text.

Figure 3:
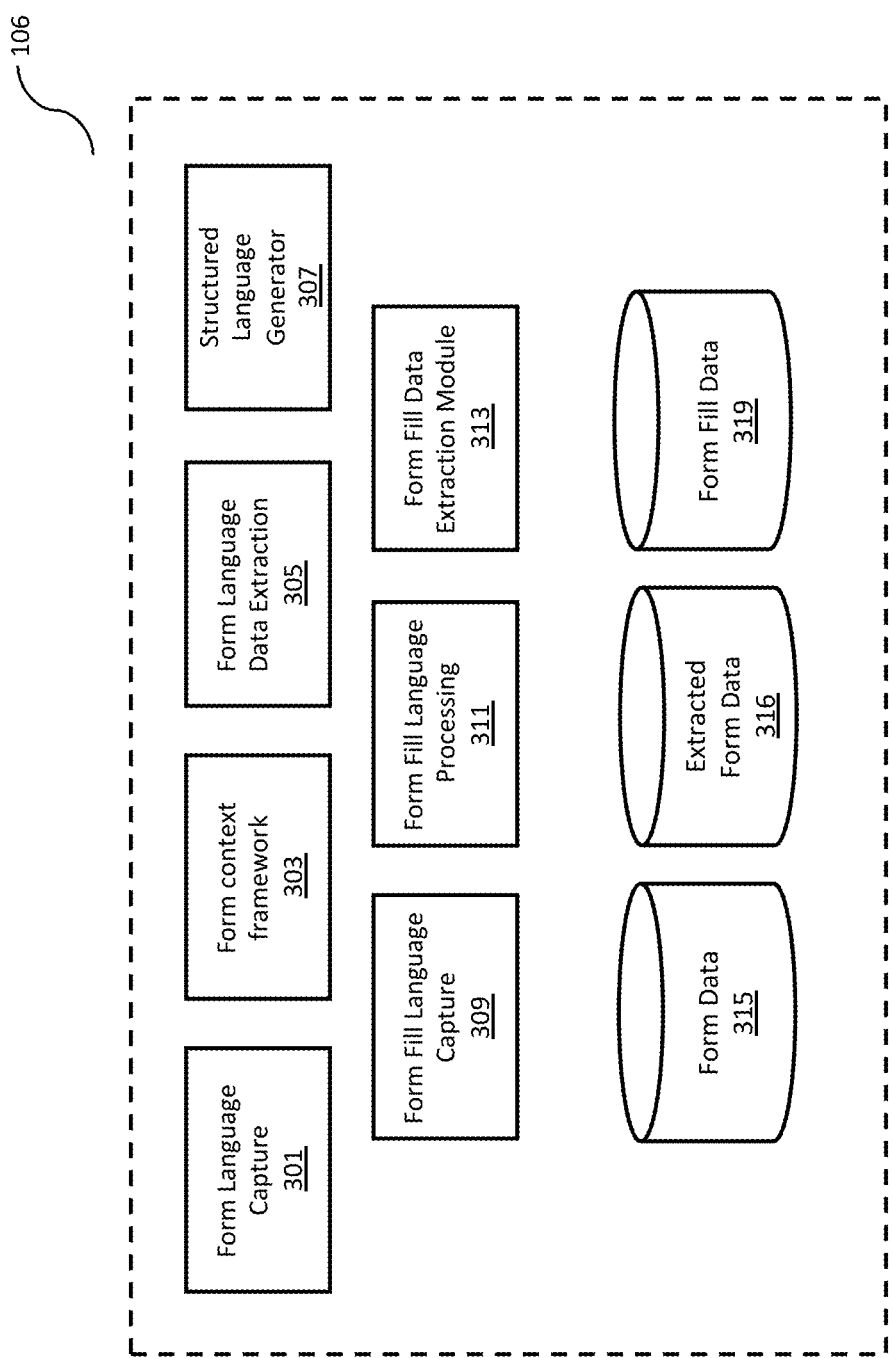
FIG. 3 illustrates functional modules that can comprise an electronic form generation system in accordance with an embodiment of the present invention.

FIG. 3 illustrates functional modules of electronic form generation and fill system 106 according to some embodiments. These modules may be implemented across a range of hardware and are not necessarily each bound to a specific item of hardware or other underlying technology. For example, data module 315 may be implemented as a relational database, in-memory data storage, NoSQL, columnar, and/or streaming data, key-value storage and retrieval system residing on dedicated hardware and/or distributed in a physical and/or logical manner.

Form language capture module 301 of the electronic form generation and fill system 106 captures text input being typed in by the authoring user at the authoring user device 102. If the input is in another form, for example, audio, form language capture module 301 may convert such input into text or otherwise interpret the input.

Form context framework module 303 assesses the context, in which the input from the authoring user device 102 may be provided and determines a contextual framework for subsequent text processing. As a part of this assessment, the form context framework module 303 may identify, estimate, and derive the user's language preference(s), geolocation(s), region(s) and data format(s) based on past interactions of the user with form generation and fill system 106.

Form language data extraction module 305 determines the likely intended structure of the electronic form based on input from form language capture module 301 and form context framework module 303. Module 305 processes natural human language and/or near-natural human language supplemented with meta information to identify elements of electronic forms, for example, form title, summary, actions, functions, data processing and handling rules among other things.

Module 305 may employ staged methods of processing natural human language, for example, including multi-phase text pre-processing, parsing, structure composition analysis, extracting structured data, which may be used to generate the electronic form.

Pre-processing may involve text extraction and cleanup, using sentence and word tokenization, stemming, lemmatization, and stop-word removal. Parsing may involve tagging, named entity recognition, template element and form entry recognition. Analysis may involve matching data collected during parsing against the context framework for identification and/or definition of specific elements of the electronic form, for example: text paragraphs, form field sections, and individual form fields, which may be explicitly defined in a given language, geographical region as well as optionally building logical interconnects between different elements of the electronic form. Form availability requirements, timing and location constraints may be identified at this stage. Structure composition utilizes data produced during analysis stage is used to produce a structured definition of the electronic form.

Module 305 may further employ a bag of words, network representation, or other Natural Language Processing (NLP) model augmented by synonym word dictionaries in languages that may be potentially used the description of the electronic form for the purpose of allowing the user extensive freedom of directive expression. A relaxed approach such as this allows for the use of multiple languages and dialects as well as simple written/spoken mistake autocorrection, which may be improved further with the addition of predictive algorithms.

Module 305 may also detect common patterns in the natural human language used to describe the electronic form. For example, certain patterns may be common to electronic form element definitions. Such patterns may be recognized and corresponding user directives may be tagged for subsequent analysis and conversion into structured data. Processing utilized by module 305 may offer additional flexibility in directive expression due to its ability to largely ignore grammar, sentence structure, and permit a variety of synonyms, which can be used to express a commonly recognized task. For example, while defining an exception to the form availability rule the user may use any one of the following trigger words: "with exception", "with an exception", "with the exception", "exclude", "excluding", "exempt", "exclusive of", "leaving out", "omitting", "barring", "beside", "leaving", "aside from", "apart from", "short of", "skip", "minus", "outside", "without", "rejecting", "saving", "save", "bar", "but", "if not", "no", "not", combinations or even slightly misspelled versions of these trigger words to the same result.

Permissive logic, if employed by module 305 may assist with authoring of the most likely electronic form template representation based on the natural human language, non-structured or with a minimal structure, input narrative provided by the authoring user. Language processing components of module 305 may not report errors or ambiguity messages to the user. Instead, subsequent user correction of the narrative is used to correct the electronic form representation if a correction is requested by the user.

To the extent that the electronic form generation system 106 relies on electronic dictionaries and/or other word and expression repositories used to aid module 305 in processing the language of the description input by the authoring user, such dictionaries and or repositories may be dynamically updated or augmented otherwise. The dynamic updates and augmentation may be performed based in a variety of ways including computer learning, including utilizing descriptions and other inputs from one or more authoring users.

Module 305 may identify macro meanings of terminology utilized in the natural human language description of the form. For example, when identifying a term "name," module 305 may output an instruction to generate a field-set comprising the First Name, Middle Name, Last Name fields. In this example module 305 may also generate a rule-set, for example, to capitalize each of the entered first, middle and last names. In another example, a natural human language description of "pay $20" may generate a combination of field-sets and rule-sets. The field-set will consist of a set of fields associated with a credit card or other form of payment (for example, ACH, PayPal, virtual currency, etc.), payment processor integration instruction. The rule-set for each of the payment types may include validation logic, such as credit card number validation, length validation for ABA bank routing numbers. Input from form context framework module 303 may provide generation of specific field-sets and rule-sets, for example, by generating fields for entry of banking information specific to the identified geographic location of the authoring user device 102. In a further example, the address information fields will account for information and formats of the addresses consistent with the identified geographic location of the authoring user device 102.

Module 305 may perform further assessments of the natural human language input and the resulting form as a whole by, for example, identifying potential interdependencies between the form elements described by the user. Based on the results of this assessment, post-processing is applied to the electronic form in order to improve the field flow and remove possible duplicate form field sections or individual form fields. For example, if the authoring user provided the description of a postal address section to be present near the top of the form and later described collecting payment, then both sections may be interlinked to avoid duplicative filling of data into the distributed form.

Structured language generator module 307 obtains input from the form language data extraction module 305 and generates an electronic form represented in a structured language, as for example, a markup language, computer programming language, etc., which in turn, may be output in a text format, a partially or fully interpreted format, a partially or fully compiled binary format or combination of any of the above, suitable for preview while being authored on the authoring user device 102 and, once determined by the authoring user as being complete, distribution of electronic forms to user devices 104.

In some embodiments, the output of the structured language generator module 307 is received processed and rendered as a preview of the electronic form in the user interface of the authoring user device 102. Such processing and rendering may be performed in real-time, substantially in real-time, or near real-time. Thus, a preview of the electronic form appears as the authoring user inputs a description of the form into the authoring user device 102, even if the description is partial and substantially incomplete. The authoring user has an opportunity to interact with the preview of the electronic form, while the description is being input. The authoring user may make edits to the electronic form by making changes to the text of the description (if text input of the authoring user device 102 is being utilized). As edits are being made to the entered description, they are reflected in the preview of the electronic form.

The form description may be saved in text form as entered by the user and stored in form data storage module 315. The user may use any text editor computer software outside the electronic form generation system 106 to generate and save plain text descriptions of the electronic form. Such descriptions may be copied and pasted into the text input field 202 to generate a new electronic form without loss of proper functionality. Likewise, individual portions of the text description of the electronic form may be copied and pasted throughout the description, without loss or duplication of functionality, processing specifications and other aspects of the electronic form.

Data extracted from the description provided by the authoring user, including context data, and data resulting from the contextualization and natural language analyses such as that performed by the form language data extraction module 305 may be stored for each electronic form in extracted form data repository 316. Data from the repository 316 may be provided to the structured language generator.

In some embodiments, a user of one of the user devices 104, for example 104a, may fill with requested information the electronic form distributed from the electronic form generation system 106. The user may fill the information in a variety of ways, depending on the types of input devices and methods available at the user device 104a. Filled information may be transmitted to the electronic form generation system 106 via network 130 and stored in filled form data repository 319. In embodiments where the distributed form is rendered on the user device 104a as audio, the user may fill the information requested in the electronic form by using a voice input or another type of input that accepts natural human language. In embodiments where natural human language is utilized to fill the electronic form, the inputted language may also be processed utilizing techniques for natural language processing, identification of context, and data extraction like those described for authoring of electronic forms and performed by modules 309, 311 and 313. Language input, identification of context, and data extraction may take place on the user device 104a, for example, and may utilize intelligent electronic assistants and data available to them for filling the information requested in the distributed electronic forms.

In embodiments where other types of electronic information and data gathering and/or interchange mechanisms are generated from the description provided by the authoring user, an electronic form or document may not need to be rendered. Instead use devices 104 may be presented with requests calling for use of an application programming interface (API) and involvement of the user operating user device 104 may be delegated to intelligent assistants or other forms of automated or semi-automated response. For example, the user may simply respond to an incoming request using an oral response "sign me up," which will be interpreted by the device 104*b*, for example, to fill in or provide in a different manner information it has about the user, such as name, address, and so on.

Figure 4:
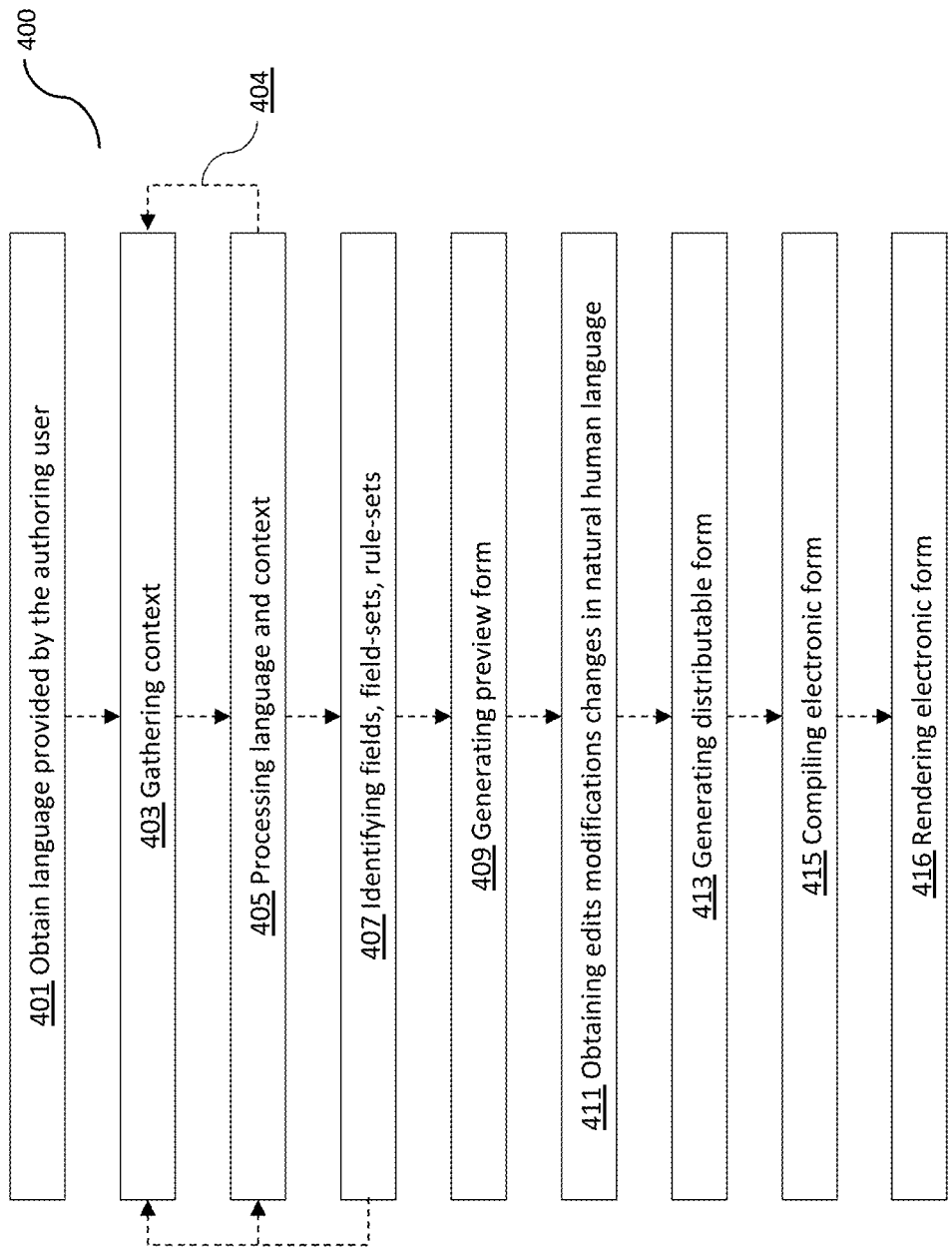
FIG. 4 illustrates a method for performing electronic form generation in accordance with an embodiment of the present invention.

FIG. 4 illustrates a method that may be utilized in the operation of an electronic form generation system, according to some embodiments. Method 400 enumerates steps that may occur in operation of the electronic form generation system 106. The steps shown here are for illustrative purposes and may occur in a sequence different than the one depicted and described herein. Some steps may occur concurrently or in a combination, while others may be omitted and/or substituted.

In step 401 the electronic form generation system receives or obtains otherwise natural human language, used to describe the desired electronic form by the user authoring the electronic form at an authoring user device (e.g., authoring user device 102). The natural human language may be represented as text, audio, or another representation.

In step 403 the electronic form generation system 106 may gather additional context, which may be helpful in identifying the intent of the authoring user with respect to the electronic form that is being created and extracting relevant meaning. In some embodiments, the natural human language describing the electronic form may contain supplemental information, such as meta information, have minimal structure, contain specialized terminology, and/or other elements, which may assist with derivation of user intent, meaning, and other types of context. As described above relative to the form context framework 303, context may also be derived from meta information about the authoring user device 102, such as its geographical location derived from the device's own geolocation hardware and related APIs, its network identifier, and/or information specified by the authoring user. In additional embodiments, the language used by the authoring user while describing the electronic form may also be utilized for context analysis and derivation. The language describing the electronic form and context may be processed in step 405 to extract actionable data.

In step 407 the electronic form generation system may utilize the actionable data to determine fields, rules and/or field-sets, rule-sets which are appropriate for the actionable data. In step 409 the electronic form generation system may generate a preview of the electronic form such that the authoring user may evaluate visually, for example, what the electronic form will look like, based on the description provided by the electronic user. The generation of the preview, may include generation of markup language, or a computer programming language, necessary for the fields, rules and/or field-sets, rule-sets to be displayed or rendered otherwise as a portion of the user interface 200 shown at the authoring user's device 102. The authoring user may provide edits, modification, additions and other changes to the description of the electronic form, which the electronic form generation system 106 may receive or obtain otherwise in step 411. The user may perceive that changes to the description cause the preview electronic form to reflect such changes in real-time, near real-time, or in substantially real time.

After the user determines that the electronic form is complete, the form may be marked for distribution and similarly to the preview a distribution copy may be generated in step 413. Like the preview, the distribution form may be generated in a markup language, a computer programming language, and later compiled fully or partially in step 415 before or after being transferred to the user device 104, where it may be rendered in step 416 into visual, audible or another form to be perceptible and actionable upon by the user of the user device 104.

FIG. 5 illustrates a user interface 500 for entry of natural human language or near-natural human language and resulting context-informed rendering by the electronic form generation system in accordance with an embodiment of the present invention. The authoring user may enter a description of the form requiring an address. The electronic form system 106 may interpret the description and generate a field-set 504 based on the location of the user and other context.

Figure 6:
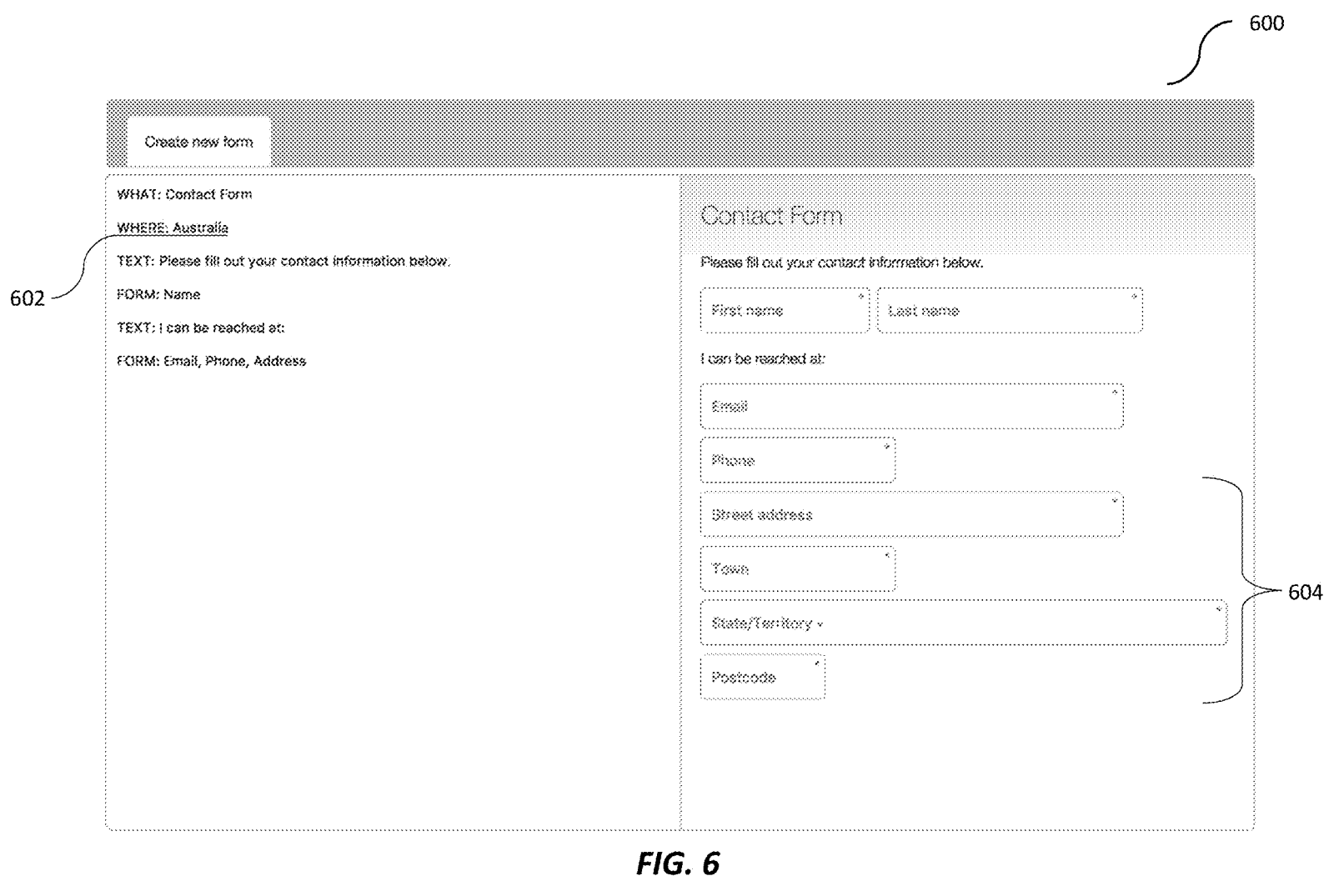

FIG. 6 illustrates a user interface 600 for entry of natural human language or near-natural human language and resulting context-informed rendering by an electronic form generation system in accordance with an embodiment of the present invention. Similar to the embodiment of FIG. 5 the authoring user may enter a description of the form requiring an address. The electronic form system 106 may interpret the description and expand it into a field set based on the location of the user and other context. The electronic form generation system 106 may perform step 406 attempting to identify further context in the description entered by the authoring user and processed by module 305. Such additional processing for identification of further context may, for example, determine that the authoring user intends to collect Australian address by specifying the target region 602. The electronic form generation system responds by generating a field-set 604 reflecting Australian address formatting and information.

The identification of additional context, such as that illustrated in FIG. 5 and FIG. 6 and described above, and its integration into the output preview or distributable electronic form may take place without the need to re-configure user preferences, user interface settings, or having to override other context identified in the course of the interaction between the system 106 and the authoring user. As described further below, context applicable to the electronic form may be represented in a hierarchical manner so as to allow more specific context information for a particular section to override or supplement context information applicable at the global level, for example.

The exemplary embodiments set forth herein describe electronic forms as a use of the invention. The approaches shown are equally applicable to generation of other types of electronic documents, applications, application programming interfaces, user interfaces, computerized information and data interchange and/or gathering systems among others.

Figure 7:
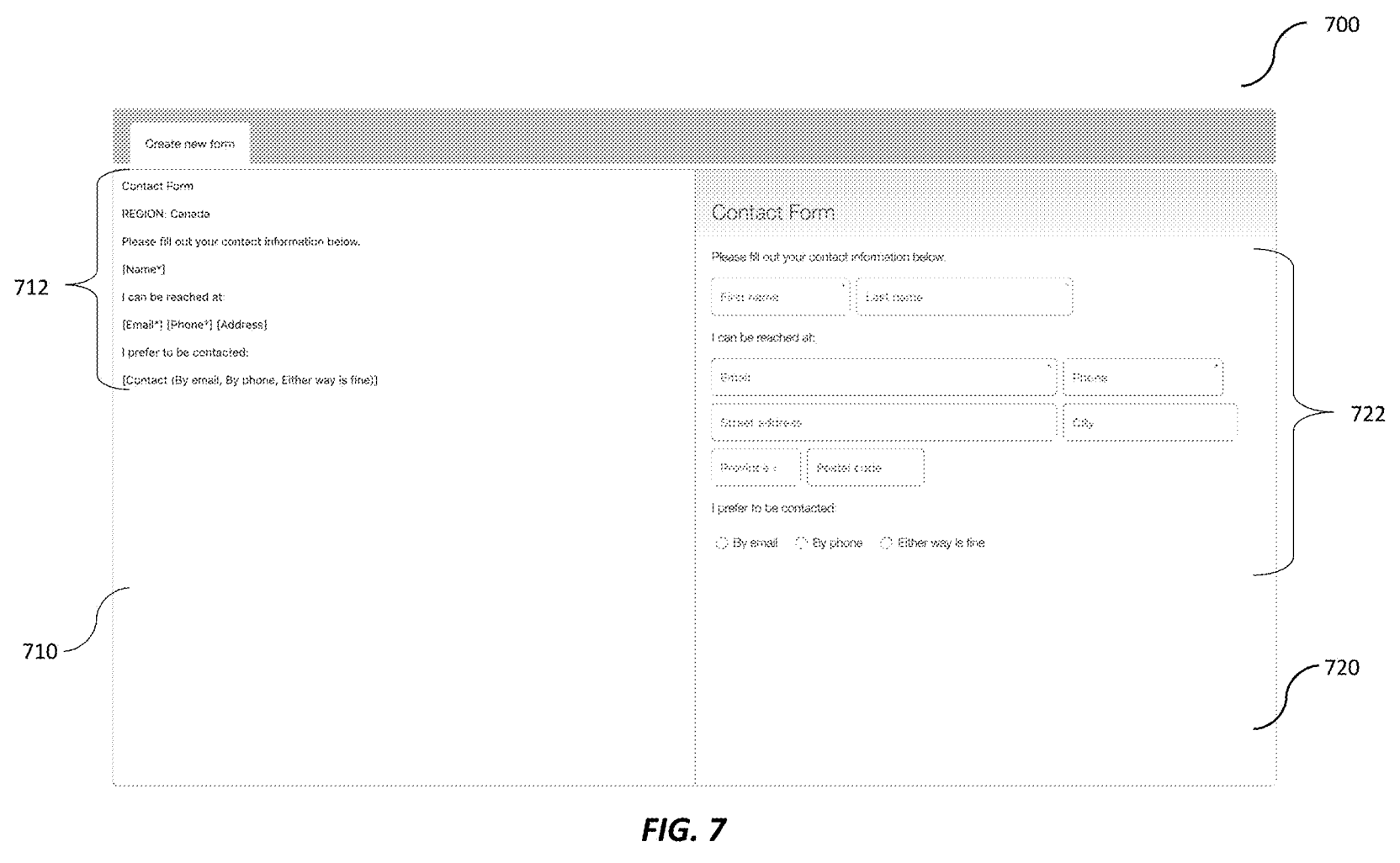

FIG. 7 illustrates a user interface 700 for entry of natural human language or near-natural human language and resulting context-informed rendering by an electronic form generation system in accordance with an embodiment of the present invention. As described above the electronic form generation system may include a client component (e.g., a web page or a native app on a client computer system, smartphone or tablet computer) and a server component (e.g., a server farm, cluster or cloud).

In one embodiment, the client component includes a web browser application capable of interpreting and rendering World Wide Web standards and technologies such as HTML, JavaScript, etc. The client component is responsible for providing text input for definition of the desired electronic form, it utilizes a transport mechanism (e.g., an asynchronous AJAX, HTML5 Web Sockets, Comet, REST) for marshalling the text form definition to the server component, receiving content or structured data (e.g., in the form of a markup language, like HTML, XML, JSON, or another data format) or another computer programming language) for the form preview from the server component, and rendering the form preview for the authoring user to see via a display of the authoring client system. The client component may transmit the text description of the electronic form input by the authoring user to the server component on a constant or periodic basis. For example, the client component may stream information provided by the authoring user or periodically transmit (e.g. multiple times each second) the entirety of the available text description of the electronic form input by the authoring user up to the time of transmission. Meanwhile, the server component is responsible for receiving the text form definition from the client component (e.g., via AJAX, WebSockets or another network protocol), analyzing the text, parsing the form definition from it, building the form model, rendering the form model into a preview, for example, in the form of HTML code and marshalling the preview back to the client component. Again, as noted above, functionality performed by the client component and the server component may be distributed in other ways and the client component and the server component may reside on the same device or on different devices and communicate via a network (e.g., the Internet).

In the context of the present example, the client component displays an HTML page 700 provided by the server component and includes two primary elements, a text input field 710 through which the authoring user provides the electronic form definition (e.g., a text-based description 712 of the desired electronic form expressed in a natural language) and a form preview area 720 in which a fully functional version of an electronic form 722 resulting from the electronic form definition is displayed.

When the client component is running on a mobile device (e.g., a smartphone or a tablet computer) having one or more of processing, memory, networking, battery life constraints and/or based on other matters of design choice, all or a substantial portion of the form processing can be offloaded to the server component. In this manner, the client component's responsibilities can be limited to, for example, running code provided by the server component as part of the form authoring web page 700, collecting form definition 712 from the authoring user, marshaling the definition 712 to the server component, receiving the response from the server component in the form of HTML code, for example, for form preview, and displaying the preview of the electronic form 722 to the authoring user in the form preview area 722. An advantage of performing minimal functionality by the client component is ensuring maximum compatibility with a wide range of client user interface devices (e.g., desktop computers, laptops, smartphones, tablets, web kiosks, and the like).

As noted above, for purposes of enabling efficient interaction with the form generation system, in one embodiment, user interface 700 intentionally constrains input of text describing the electronic form 712 to text input field 710, thereby limiting definition and editing of the electronic form 722 to a single active user interface control. In this manner, navigation through a complex interface can be avoided, thereby allowing an authoring user to be as efficient authoring an electronic form on a mobile device as compared to authoring the electronic form on a desktop computer or a laptop. Additionally, in one embodiment, the user interface 700 may concurrently provide a real-time or near real-time preview of the electronic form 722 in a fully functional state within the form preview area 720, thereby allowing the authoring user to test the electronic form without having to change modes (e.g., from an editing mode to a testing mode).

Figure 8:
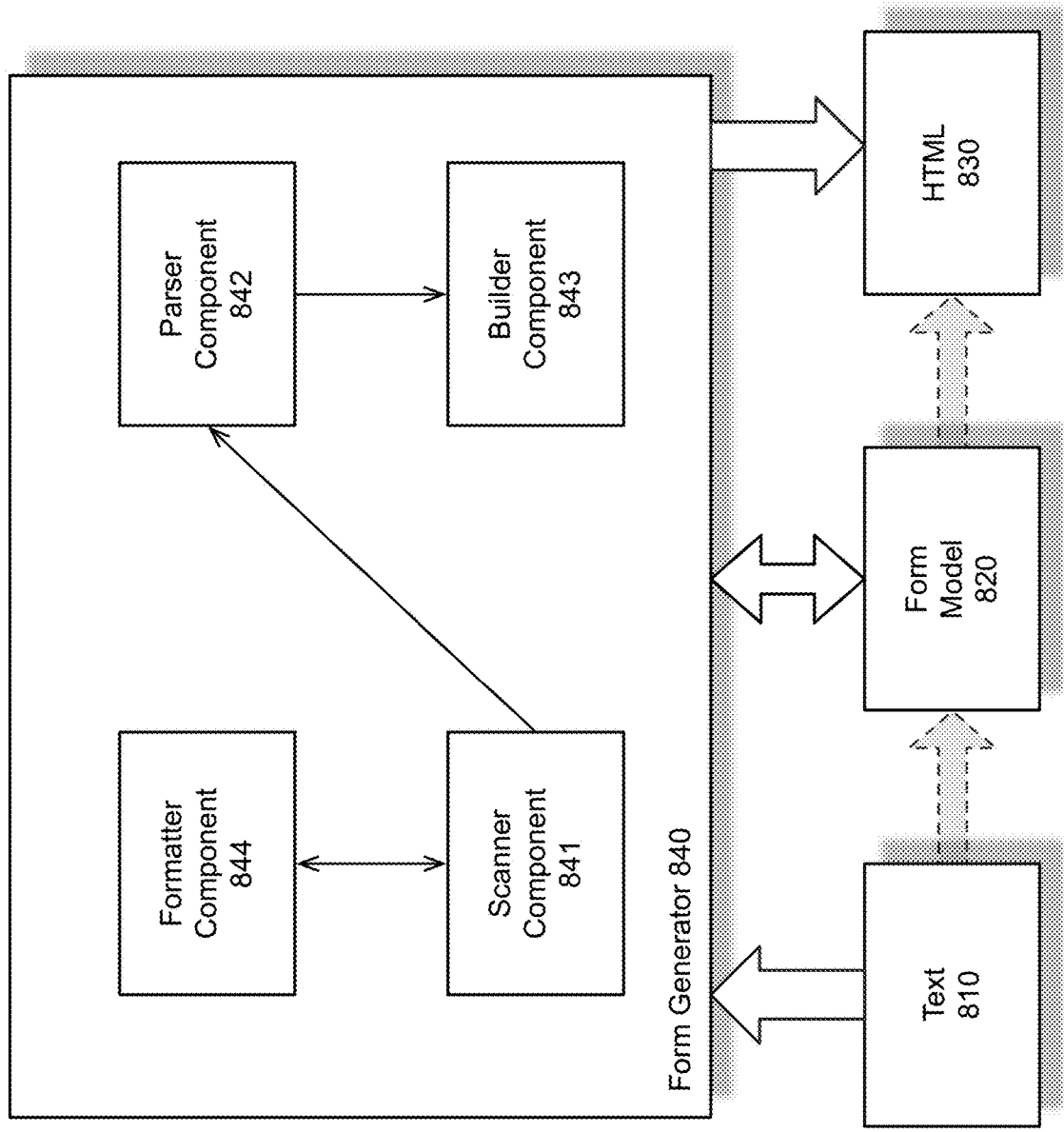
FIG. 8 illustrates a conceptual representation of processing performed by and interactions among various functional modules of a server component of an electronic form generation system in accordance with an embodiment of the present invention.

FIG. 8 illustrates a conceptual representation 800 of processing performed by and interactions among various functional modules of a server component of an electronic form generation system in accordance with an embodiment of the present invention. As described above with reference to FIG. 3 and module 305 and module 307 staged methods of processing natural language may be employed in embodiments of the present invention, for example, including multi-phase text pre-processing, parsing, structure composition analysis, extracting structured data, which may be used to generate the electronic form. In the context of the present example, form generator 840 represents one potential distribution of functionality among exemplary functional modules to accomplish the staged processing described above with reference to FIG. 3 and modules 305 and 307.

In one embodiment, description of an electronic form represented as a natural language (e.g., text 810) is received from the client component (e.g., the authoring user device 102) and is processed by a form generator 840 to create an intermediate representation (a form model 820) from which a structured language (e.g., HTML 830) can be used to cause the client component to display a preview of the fully functional electronic form. Upon completion of the form generation process, form model 820 will contain structural data representing form sections, form elements, form fields, etc. as well as processing context (e.g., geographic location, time/date, language, etc.) and logic (e.g., whether particular form element(s)/field(s) are required, associated validation logic, associated constraint checking logic, logic determining whether detection of specific element requires inclusion, display, validations of a new set of other elements, or removes the requirement for inclusion and display of other elements, logic may be derived from one or more contexts as they become apparent from analysis of the form description 810, etc.).

A non-limiting example of logic that may be stored within the form model 820 includes rules relating to interdependencies between and among various form fields. For example, multiple payment options (e.g., credit card, ACH, PayPal, virtual currency, etc.) may be available for selection on an electronic form and responsive to the filling user's selection of one of the payment options may cause additional form fields to be displayed for collection of information specific to the selected payment option and/or remove form fields associated with collection of information specific to the non-selected payment option(s). Similarly, an electronic patient intake form, for example, may enable/disable presentation of subsequent questions based on a gender selection made by the filling user. For example, selection by the filling user of the male gender may trigger logic removing inquiry relating to whether the user is pregnant.

Responsive to receipt of text 810 by the server component via a transport mechanism a request from the client component, for example, form generator 840, representing a portion of the functionality of the server component, extracts textual form definition from the client request, passes it to the generator process building the form model of the electronic form, generates a structured language output (such as HTML, JavaScript, etc.) resulting from the form model, and returns the structured language output to the client component which may render a form preview visually to the user. According to one embodiment, this real-time interaction between the client component and the server component, over the Internet provides a real-time electronic form generation user interface building method currently unavailable in the electronic form generation market.

In the present example, the form generation system may use a collection of one or more scanners (e.g., scanner component 841), a collection of one or more parsers (e.g., parser component 842), a collection of one or more builders (e.g., builder component 843) and a collection of one or more formatters (e.g., formatter component 844). These components may interact in a successive or another relationship to generate a form model 820. Form generator first transmits the text-based definition of the electronic form (e.g., text 810) to scanner component 841 to identify logical sections and form elements. Each section and element of the electronic form may be assigned a context determined by the scanner component 841.

Parser component 842 determines payload associated with sections and elements, for example this could include values for a static field, such as a, section title, or a name, values, types, parameters, and logic associated with dynamic fields. Builder component 843 places this information into a model 820 in a neutral format that may be used to generate code or another type of structured output. As the authoring user enters description of the form, the system continuously evaluates and extracts context, which, in turn alters payload determination and causes model 820 to update.

As described above, scanner component 841, among other things, determines context and breaks the form definition into sections. Using the example of the text-based description 712 provided in FIG. 7, once the form definition has been processed by scanner component 841, the electronic form may be broken into logical sections and elements described internally as having a payload, a type, and a context. A payload may be text extracted from the form description 712, in other instances it may be structured data extracted from the form description 712, a type identifies elements, such as, for example, a header, text, field, or a field set, while context may identify region, language, position of the element in the sequence of form elements, and/or other parameters that dictate logic.

Scanner component 841 may also be responsible for detecting and tracking the locale(s) of the electronic form, which may change from section to section, as well as determining the supporting attributes of each section of the electronic form, such as the type of payload (plain text vs. rich text vs. markup vs. well-formed structural definition such as WL, type of markup, whitespace considerations, etc.).

During the process performed by the scanner component 841 it may utilize formatter component 844 to probe sections of the text 810 against known patterns. If detected, the pattern can be normalized. In one embodiment, flexibility is provided so as to allow the authoring user to use various alternative notations. For example, a field set used for collecting a First Name and a Last Name (or a First Name, a Middle Name and a Last Name) may be defined using one or more alternative notations, all of which can be treated the same by form generator 840.

Alternative notations may include the use of predetermined punctuation characters, keywords and/or predetermined symbols to define and/and configure electronic form elements/fields. Those skilled in the art will recognize the use of particular symbols, punctuation and certain keywords are a matter of design choice and will therefore appreciate there are numerous possible variations and alternative notations as well as completely different notation conventions that may be employed than those employed in FIGS. 2, 5, 6 and 7.

In the context of the present example, parser component 842 converts text payloads of form sections and elements into structural data. In one embodiment, parser component 842 may use formatter component 844 to detect and convert textual representation of the data into structural data. Parser component 842 may be built using a mix of regular expression (regex) libraries, translation dictionaries, lexical analyzers, and natural language processors (NLP). Parser component 842 may use one or more macro pre-processors.

According to one embodiment, an email address parser of the parser component 842 will detect, based on the presence of the asterisk, that this is a required form field for textual data input of type "email address", with the corresponding constraints determined by Request for Comments (RFC) 5322 and RFC 5321, to be processed by a dedicated email formatter associated with formatter component 844.

According to one embodiment, a form element containing the word 'Name' may be captured by an English language macro parser of the parser component 842 that will translate Name into a field-set, including a combination of "First name, Last name", for example, and apply appropriate constraints to the field definitions (e.g., first letter of each field needs to be capitalized, exclude non-alphabetic characters of the Unicode set, etc.).

In one embodiment, parser component 842 may determine complexity of the underlying form element and attempt to identify all defining attributes of the form element. A form element definition may be parsed as a multiple choice form field named "Contact", with available choices of "By email", "By phone", and "Either way is fine". As noted above in connection with the discussion of module 305, the parser can allow for multiple possible patterns leading to the same parsed result.

According to one embodiment, parser component 842 recognizes and actively uses both markup and punctuation as parts of template recognition. For example, a multiple-choice form field list parser of the parser component 842 may recognize both "," and "/" as valid punctuation mark separators for the list of available options. Parser component 842 may also make determinations regarding field types and field attributes based on punctuation and markup. Parser component 842 may also modify and/or drop markup in payload definitions as necessary.

Parser component 842 may utilize context as determined by the scanner component 841 in the previous step. As noted above, the likely intended structure of the electronic form may also be informed based on the language in which the text-based description of the electronic form is expressed by the authoring user. Therefore, continuing with the present example, in one embodiment, the following form element referring to an address in the US regional context may be parsed as a set of required fields for street name, city, state (as a list of US state abbreviations), ZIP code, and pre-filled country field. A form element referring to an address in the context of francophone Canada, may be parsed as a set of required fields labeled as "Addresse de rue," "Ville," "Province," (as a list of Canada province abbreviations), "Code postal," and "Pays" (pre-filled to Canada). The regional context for francophone Canada may be extracted from the character set used to enter the description of the form, IP address-based geolocation, spelling, and other information.

A formatter component 844 converts textual data to objects and vice versa. Formatter component 844 may be utilized to recognize and process dates, locales, currency, numbers, addresses, telephone numbers, Uniform Resource Locators (URLs), email addresses, and more. Individual formatters associated with the formatter component 844 may be implemented to be locale specific and context dependent.

A builder component 843 produces the constituent parts of and generates the form model 820 model for the electronic form.

Figure 9:
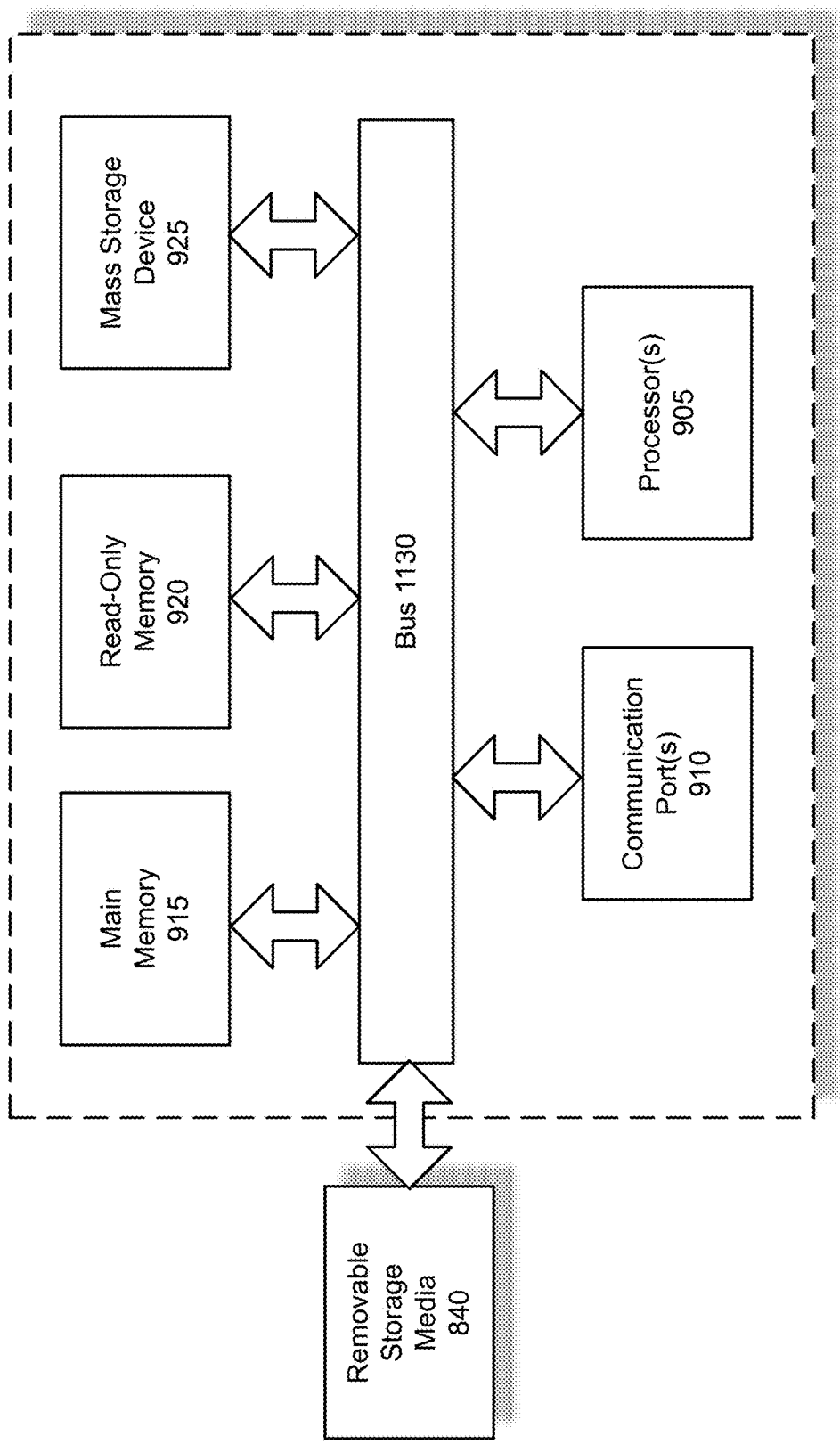
FIG. 9 is an exemplary computer system in which or with which embodiments of the present invention may be utilized.

FIG. 9 is an example of a computer system 900 with which embodiments of the present invention may be utilized. Computer system 900 may represent or form a part of a server computer system of electronic form generation and fill system 106 or a user device (e.g., user devices 104*a-n* or authoring user device 102).

Embodiments of the present disclosure include various steps, which will be described in more detail below. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 900 includes a bus 930, at least one processor 905, communication port 910, a main memory 915, a removable storage media 940, a read only memory 920 and a mass storage 925. Those skilled in the art will appreciate that computer system 900 may include more than one processor and more than one communication port.

In the context of a fixed computer system, such as a desktop computer system or a server, examples of processor 905 may include, but are not limited to, an Intel® Itanium® or Itanium 2 processor(s), or AMD® Opteron® or Athlon MP® processor(s), Motorola® lines of processors, or other future processors. In the context of a mobile device, examples of processor 905 may include, but are not limited to, mobile application processors or other processors designed for portable devices, such as the ARM Cortex™-A7, -A8 or A9 processor of ARM Holdings, one or more of Texas Instruments' OMAP family of processors (e.g., the OMAP2430 or the OMAPV2230), an Intel® 80386 processor, and Intel PXA901 processor. Notably, future mobile devices are likely to have at least two processors, one for carrier processing and one for application processing. As described above, processor(s) 905 may execute one or more of the functional modules described herein, such as the functional modules described with reference to FIG. 3.

Communication port 910 can be any of an RS-232 port for use with a modem based dialup connection, a 10/100 Ethernet port, a Gigabit or 10 Gigabit port using copper or fiber, a serial port, a parallel port, or other existing or future ports. Communication port 910 may be chosen depending on a network, such a Local Area Network (LAN), Wide Area Network (WAN), or any network to which computer system 900 connects.

Memory 915 can be Random Access Memory (RAM), or any other dynamic storage device commonly known in the art. Read only memory 920 can be any static storage device(s) such as, but not limited to, a Programmable Read Only Memory (PROM) chips for storing static information such as start-up or BIOS instructions for processor 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 930 communicatively couples processor(s) 905 with the other memory, storage and communication blocks. Bus 930 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 905 to system memory.

Optionally, operator and administrative interfaces, such as a display, keyboard, and a cursor control device, may also be coupled to bus 930 to support direct operator interaction with computer system 900. Other operator and administrative interfaces can be provided through network connections connected through communication port 910. In the context of a mobile device, operator interface may be via a touch-screen.

In the context of a mobile device, computer system 900 may also include a global positioning system (GPS) receiver (not shown) that provides real-time GPS location data of the mobile device. The GPS functionality may be provided by an external device or it may be integrated with the mobile device. The GPS functionality may run on its own processor and/or memory or utilize the host processor(s).

Removable storage media 940 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), flash-based removable media or the like.

Components described above are meant only to exemplify various possibilities. In no way should the aforementioned exemplary computer system limit the scope of the present disclosure.

What is claimed is:

1. A non-transitory machine readable medium storing instructions that when executed by a processing resource of a computer system cause the processing resource to:
    display on a display screen of the computer system an interactive form authoring interface including a single text entry field and a form preview area;
    accept via the single text entry field a text input relating to an electronic form being authored by an authoring user;
    send the text input to a software component operable to obtain contextual information relating to the electronic form and to generate a rendered functional preview of the electronic form based on the contextual information and the text input, wherein at least a portion of the contextual information is derived from a geographic location or region of the authoring user; and provide the authoring user with real-time or near real-time feedback regarding an appearance and functionality of the electronic form by updating the form preview area based on the rendered functional preview, wherein the form preview area is displayed on the display screen concurrently with the single text entry field and is updated in real-time or near real-time responsive to changes to the text input.

2. The non-transitory machine readable medium of claim 1, wherein the non-transitory machine readable medium is remote from the computer system.

3. The non-transitory machine readable medium of claim 1, wherein the software component runs within a remote server.

4. The non-transitory machine readable medium of claim 1, wherein the rendered functional preview enables interaction with functional form elements of the electronic form by the authoring user.

5. The non-transitory machine readable medium of claim 1, wherein the computer system comprises a mobile device.

6. The non-transitory machine readable medium of claim 1, wherein the text input is in a form of a natural language.

7. The non-transitory machine readable medium of claim 6, wherein the natural language is augmented with structure that aids the software component in obtaining the form definition information from the text input.

8. The non-transitory machine readable medium of claim 1, wherein the instructions further cause the processing resource to obtain additional contextual information relating to the electronic form, wherein the additional contextual information is derived from meta information contained within the text input.

9. A computer system comprising:
   a processing resource; and
   a non-transitory computer-readable medium, coupled to the processing resource, having stored therein instructions that when executed by the processing resource cause the processing resource to:
   display on a display screen of the computer system an interactive form authoring interface including a single text entry field and a form preview area;
   accept via the single text entry field a text input relating to an electronic form being authored by an authoring user;
   send the text input to a software component operable to obtain contextual information relating to the electronic form and to generate a rendered functional preview of the electronic form based on the contextual information and the text input, wherein at least a portion of the contextual information is derived from a geographic location or region of the authoring user; and
   provide the authoring user with real-time or near real-time feedback regarding an appearance and functionality of the electronic form by updating the form preview area based on the rendered functional preview, wherein the form preview area is displayed on the display screen concurrently with the single text entry field and is updated in real-time or near real-time responsive to changes to the text input.

10. The computer system of claim 9, wherein the software component runs within a remote server.

11. The computer system of claim 9, wherein the rendered functional preview enables interaction with functional form elements of the electronic form by the authoring user.

12. The computer system of claim 9, wherein the computer system comprises a mobile device.

13. The computer system of claim 9, wherein the text input is in a form of a natural language.

14. The computer system of claim 13, wherein the natural language is augmented with structure that aids the software component in obtaining the form definition information from the text input.

15. The computer system of claim 9, wherein the instructions further cause the processing resource to obtain additional contextual information relating to the electronic form, wherein the additional contextual information is derived from meta information contained within the text input.

16. A method comprising:
    displaying on a display screen of a computer system an interactive form authoring interface including a single text entry field and a form preview area;
    accepting via the single text entry field a text input relating to an electronic form being authored by an authoring user;
    sending the text input to a software component operable to obtain contextual information relating to the electronic form and to generate a rendered functional preview of the electronic form based on the contextual information and the text input, wherein at least a portion of the contextual information is derived from a geographic location or region of the authoring user; and
    providing the authoring user with real-time or near real-time feedback regarding an appearance and functionality of the electronic form by updating the form preview area based on the rendered functional preview, wherein the form preview area is displayed on the display screen concurrently with the single text entry field and is updated in real-time or near real-time responsive to changes to the text input.

17. The method of claim 16, wherein the software component runs within a remote server.

18. The method of claim 16, wherein the rendered functional preview enables interaction with functional form elements of the electronic form by the authoring user.

19. The method of claim 16, wherein the computer system comprises a mobile device.

20. The method of claim 16, wherein the text input is in a form of a natural language.

21. The method of claim 20, wherein the natural language is augmented with structure that aids the software component in obtaining the form definition information from the text input.

22. The method of claim 16, further comprising obtaining additional contextual information relating to the electronic form, wherein the additional contextual information is derived from meta information contained within the text input.

* * * * *